United States Patent
Matsushita et al.

(10) Patent No.: US 6,856,366 B2
(45) Date of Patent: Feb. 15, 2005

(54) REFLECTOR PLATE, REFLECTION TYPE DISPLAY DEVICE, ELECTRONIC APPARATUS, LIGHT REFLECTING METHOD AND IMAGE DISPLAY METHOD

(75) Inventors: Motohiko Matsushita, Osaka (JP); Akihiro Funamoto, Osaka (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 17 days.

(21) Appl. No.: 10/383,170

(22) Filed: Mar. 6, 2003

(65) Prior Publication Data

US 2004/0027702 A1 Feb. 12, 2004

(30) Foreign Application Priority Data

Mar. 6, 2002 (JP) ......................................... 2002-060039

(51) Int. Cl.⁷ .......................... G02F 1/1335; G02B 5/10
(52) U.S. Cl. ........................................ 349/113; 359/859
(58) Field of Search ........................... 349/113; 359/838, 359/850, 856, 857, 859

(56) References Cited

U.S. PATENT DOCUMENTS

| | | | | |
|---|---|---|---|---|
| 6,097,459 A | * | 8/2000 | Shimada et al. | 349/113 |
| 6,342,935 B1 | | 1/2002 | Jang et al. | |
| 6,466,287 B1 | * | 10/2002 | Shim et al. | 349/113 |
| 6,469,759 B2 | | 10/2002 | Jang et al. | |
| 2002/0021390 A1 | * | 2/2002 | Jang et al. | 349/113 |
| 2002/0140886 A1 | * | 10/2002 | Sugiura et al. | 349/113 |

OTHER PUBLICATIONS

Patent Abstracts of Japan, Publication No. 09–090353 dated Apr. 4, 1997, 1 pg.

Patent Abstracts of Japan, Publication No. 11–281972 dated Oct. 15, 1999, 2 pgs.

Patent Abstracts of Japan, Publication No. 2002–221716 dated Aug. 9, 2002, 2 pgs.

* cited by examiner

*Primary Examiner*—Tarifur R. Chowdhury
(74) *Attorney, Agent, or Firm*—Osha & May L.L.P.

(57) ABSTRACT

It is an object to provide a reflector plate capable of suppressing coloring caused by interference and enhancing visibility. A plurality of first reflecting units 10 and a plurality of second reflecting units 11 are provided together. In this case, a reflecting plane 11a of the second reflecting unit 11 is set to be smaller in diameter and have smaller difference in in-plane height than those of a reflecting plane 10a of the first reflecting unit 10, and an arrangement interval between the second reflecting units 11 is set to be greater than that between the first reflecting units 10.

16 Claims, 17 Drawing Sheets

PRIOR ART

PRIOR ART

Fig. 3
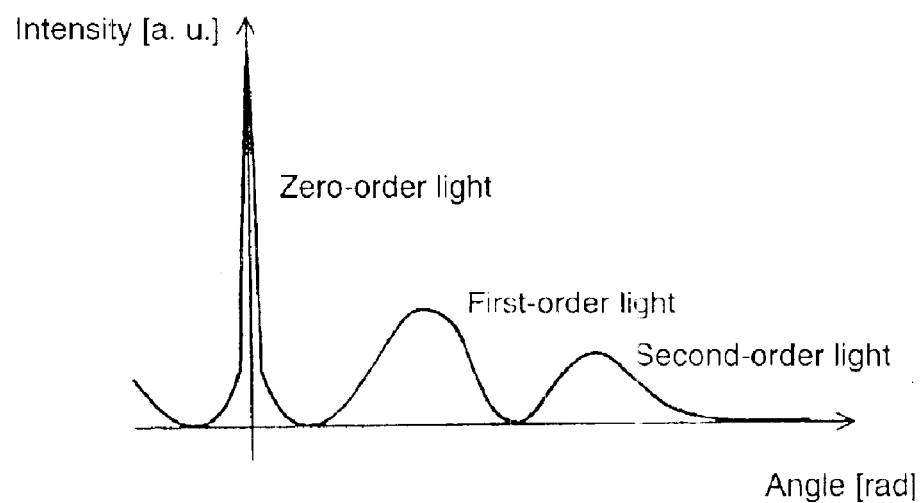
PRIOR ART
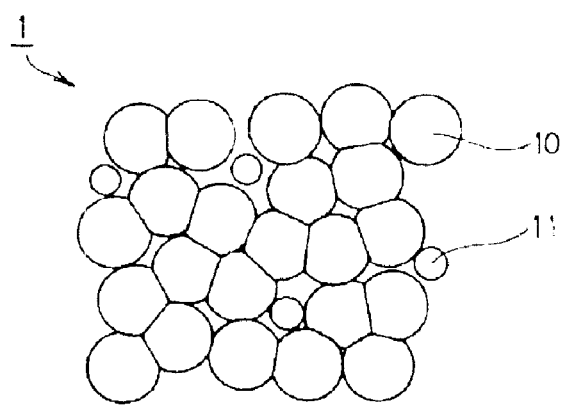
Fig. 4A
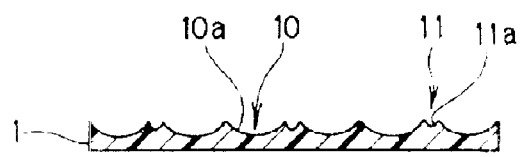
Fig. 4B

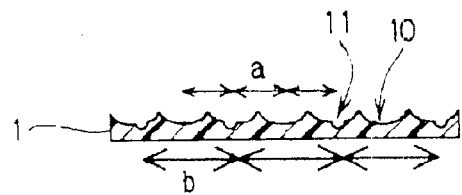
Fig. 12A
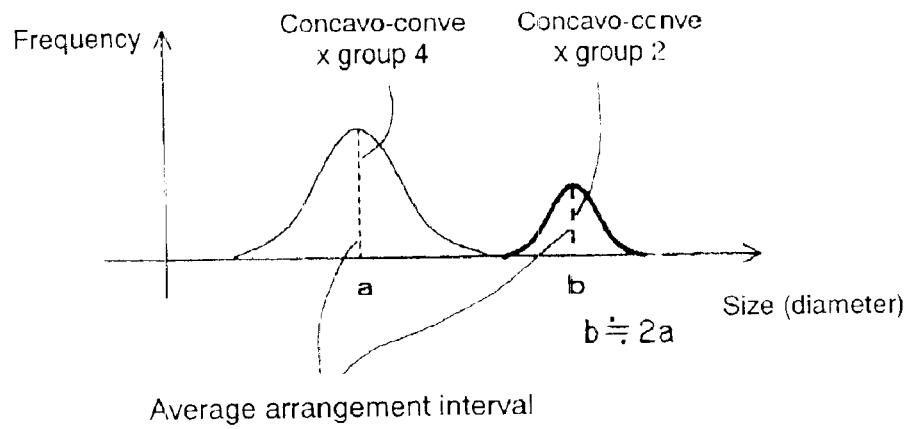
Fig. 12B
Fig. 13
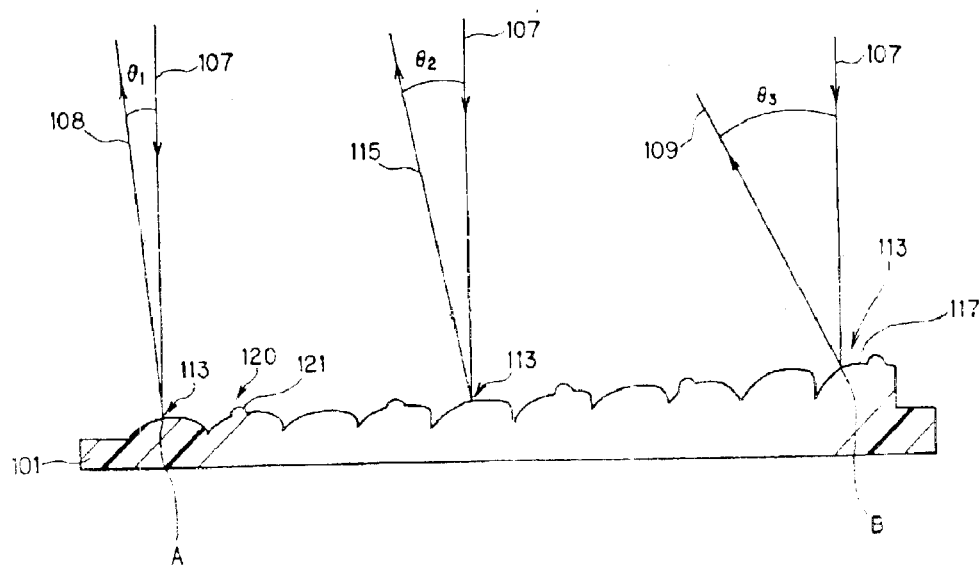

Fig. 16B (b) — Electron beam processing

REFLECTOR PLATE, REFLECTION TYPE DISPLAY DEVICE, ELECTRONIC APPARATUS, LIGHT REFLECTING METHOD AND IMAGE DISPLAY METHOD

BACKGROUND OF THE INVENTION

1. Field of the Invention

The present invention relates to a reflector plate to be suitably used in a reflection type display device and a reflection type display device comprising the reflector plate, and an electronic apparatus.

2. Description of the Background Art

In recent years, a reflection type display device for reflecting light incident from the outside and displaying a liquid crystal image without using a backlight has often been used in an electronic apparatus such as a personal computer, a television, a word processor, a cell phone or a portable information terminal in order to miniaturize, save a power and cut down cost. Since the backlight is not used in such a reflection type display device, it is important that the light incident from the outside is to be efficiently utilized to form an image.

For a reflection type display device of this type, conventionally, there has been known a structure shown in FIG. 1, for example.

The reflection type display device has such a schematic structure that a liquid crystal layer 215 is enclosed between an upper substrate 216 formed by a translucent material and a lower substrate 212 provided with a thin film transistor 214. There is provided a reflector plate 201 for reflecting light incident from the upper substrate 216 side.

The reflector plate 201 is provided between the upper substrate 216 and the lower substrate 212 as shown in FIG. 1A or provided on the back side of the lower substrate 212 as shown in FIG. 1B.

As shown in FIG. 2A, a structure of the reflector plate 201 has been proposed in which a plurality of reflecting units 210 provided with concave or convex reflecting planes having almost identical configurations to each other are arranged. Each of the reflecting units 210 is provided to have an irregularity such that an arrangement interval between the adjacent reflecting units is not completely identical. However, a variation in the arrangement interval is restricted to a constant range because of a structure in which the reflecting planes having almost identical configurations are arranged. Accordingly, the arrangement interval has a constant distribution setting an average arrangement interval to be a center as shown in FIG. 2B and acts as a reflecting diffraction grating including concavo-convex patterns having almost equal intervals if seen as a whole.

According to this structure, the incident light is scattered and reflected through each reflecting unit 210. Consequently, it is possible to prevent a deterioration in a visibility caused by the overlap of the direction of light reflected by the surface of the upper substrate 216 and that of light reflected by the reflector plate 201, and furthermore, to realize a wide angle of field.

However, there is a problem in that great coloring is caused by interference in the reflector plate 201 having the reflecting units 210, resulting in a deterioration in a visibility as described above.

FIG. 3 shows a diffracted light distribution in a Fraunhofer region of the concavo-convex pattern of the conventional reflector plate 201. It is apparent that a cyclic maximum value (peak) such as first-order light or second-order light in addition to zero-order light appears on diffracted light (zero-order light, first-order light, . . . , n-order light on diffracted light distribution in the Fraunhofer region will be hereafter referred to as zero-order diffracted light, first-order diffracted light, . . . , n-order diffracted light, respectively).

As a result of the investigations of the present inventors, it was found that the coloring caused by the interference is observed when a difference between the intensity of the first-order diffracted light and that of diffracted light at a peripheral angle is large.

SUMMARY OF THE INVENTION

In a reflector plate according to an embodiment of the present invention in which a plurality of first reflecting units and a plurality of second reflecting units are provided together in such a manner that an arrangement interval between the second reflecting units is greater than that between the first reflecting units, the first reflecting units and the second reflecting units have reflecting planes which are curved to be concave or convex, and the reflecting planes of the second reflecting units are smaller in diameter and/or have smaller difference in in-plane height than those of the first reflecting units.

The "difference in in-plane height of the reflecting plane" refers to a distance between a point on the curved reflecting plane where the incident light reaches first (the highest point of the reflecting plane) and a point where the incident light reaches last (the lowest point of the reflecting plane).

Moreover, a reflector plate according to an embodiment of the present invention comprises a plurality of first reflecting units and a plurality of second reflecting units, wherein both of the reflecting units are provided in such a manner that zero-order diffracted light obtained by the first reflecting units and zero-order diffracted light obtained by the second reflecting units overlap each other at almost equal angles and first-order diffracted light obtained by the second reflecting units appears between zero-order and first-order diffracted light obtained by the first reflecting units.

Furthermore, the present invention provides a light reflecting method for reflecting light by using a plurality of first reflecting units and a plurality of second reflecting units, characterized by reflecting light in such a manner that zero-order diffracted light obtained by the first reflecting units and zero-order diffracted light obtained by the second reflecting units overlap each other at almost equal angles and first-order diffracted light obtained by the second reflecting units appears between zero-order and first-order diffracted light obtained by the first reflecting units.

Moreover, the present invention provides an image display method for displaying an image with light reflected by using a plurality of first reflecting units and a plurality of second reflecting units, characterized by reflecting light in such a manner that zero-order diffracted light obtained by first reflecting units and zero-order diffracted light obtained by the second reflecting units overlap each other at almost equal angles and first-order diffracted light obtained by the second reflecting units appears between zero-order and first-order diffracted light obtained by the first reflecting units, and controlling a transmittance of the reflected light by a layer for varying a transmittance of light so as to displaying an image.

BRIEF DESCRIPTION OF THE DRAWINGS

FIG. 3 is a chart showing a diffracted light distribution in the Fraunhofer region of the conventional reflector plate, FIG. 4 is a typical view showing the schematic structure of a reflector plate according to the first embodiment of the present invention, FIG. 12 is a typical view showing the schematic structure of a reflector plate according to the fourth embodiment of the present invention, FIG. 13 is a typical view showing the schematic structure of a reflector plate according to the fifth embodiment of the present invention.

DESCRIPTION OF THE PREFERRED EMBODIMENTS

Preferred embodiments of the present invention will be described below in detail illustratively with reference to the drawings. The dimensions, materials, shapes, and relative arrangements of components described in the following embodiments are not restricted to the scope of the present invention without specific description.

(First Embodiment of Reflector Plate)

Figure 1A:
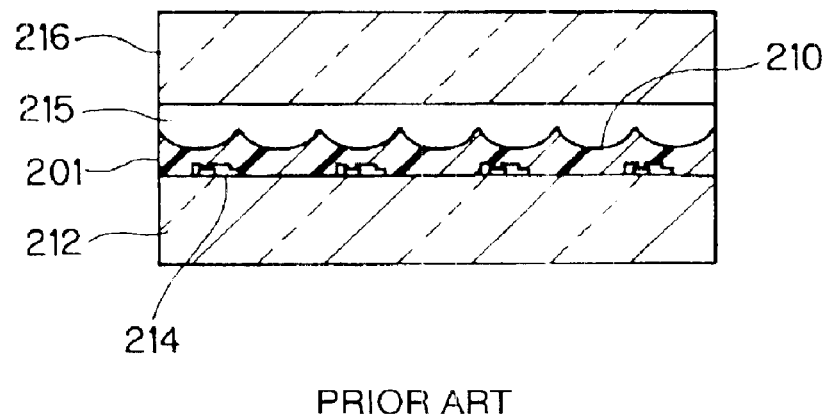
FIG. 1 is a typical view showing the schematic structure of a reflection type display device comprising a conventional reflector plate.
Figure 1B:
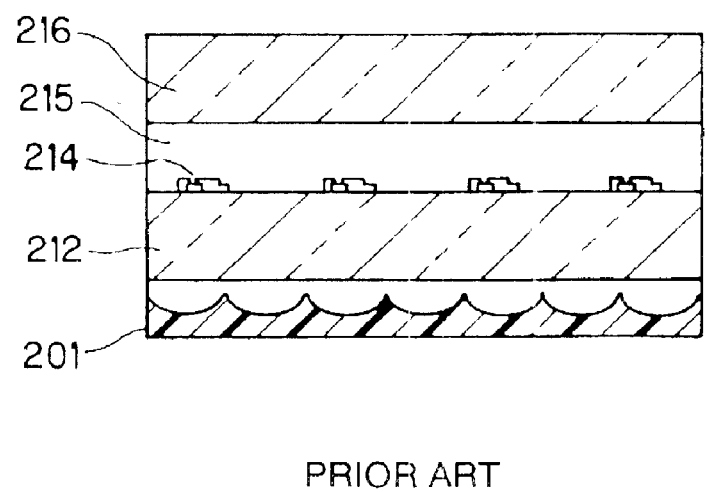
Figure 2A:
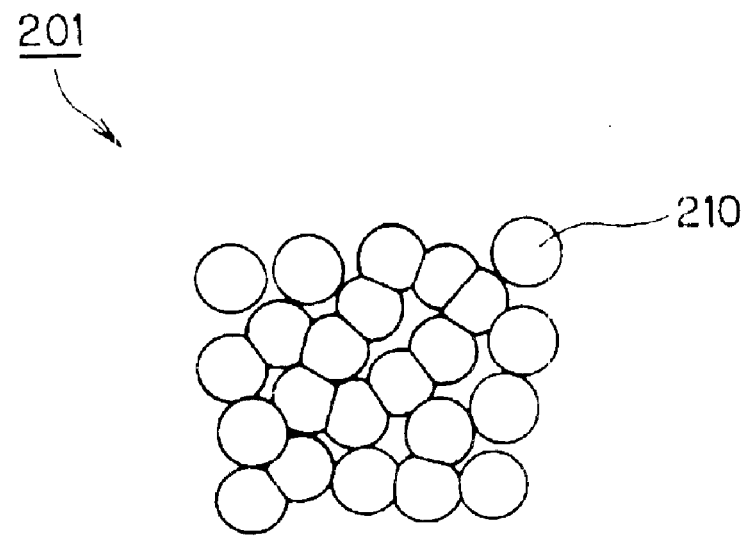
FIG. 2 is a typical view showing the schematic structure of the conventional reflector plate.
Figure 2B:
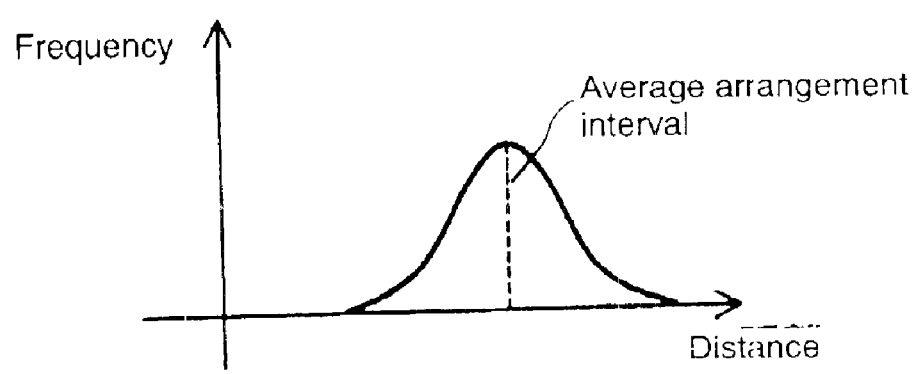
Figure 5A:
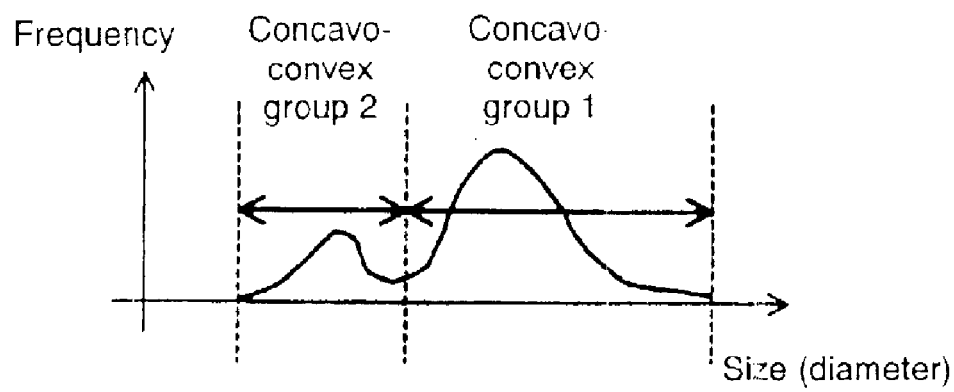
FIG. 5 is a chart for explaining difference in size between a concavo-convex group 1 and a concavo-convex group 2.
Figure 5B:
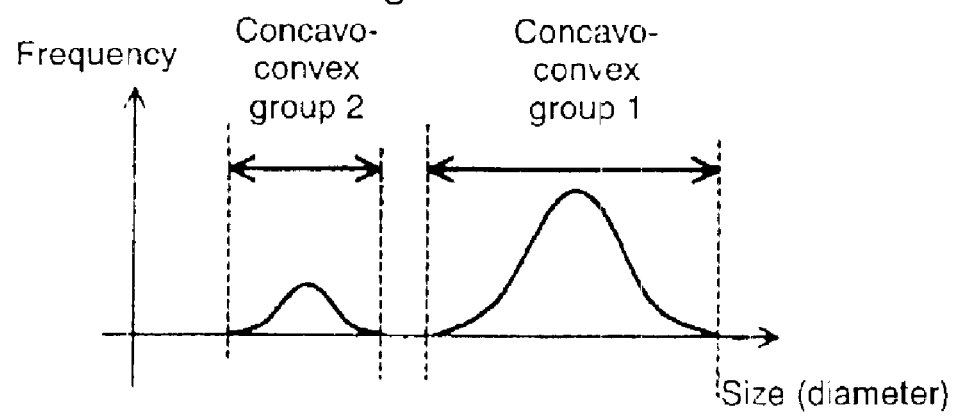
Figure 5C:
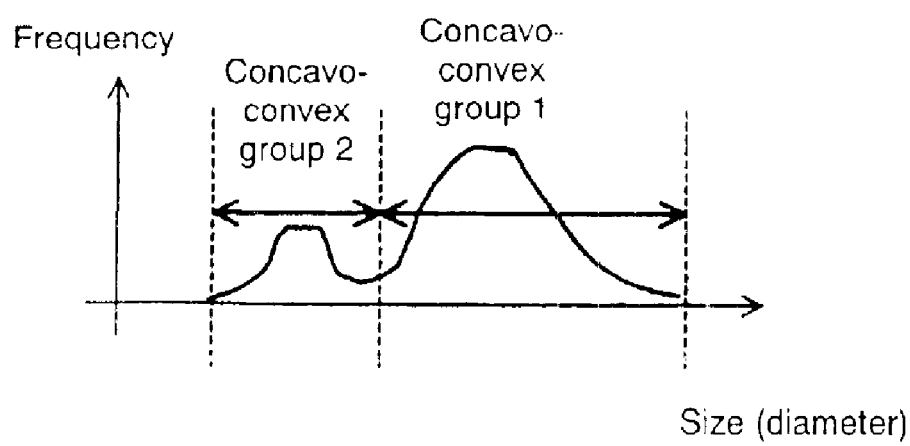
Figure 6:
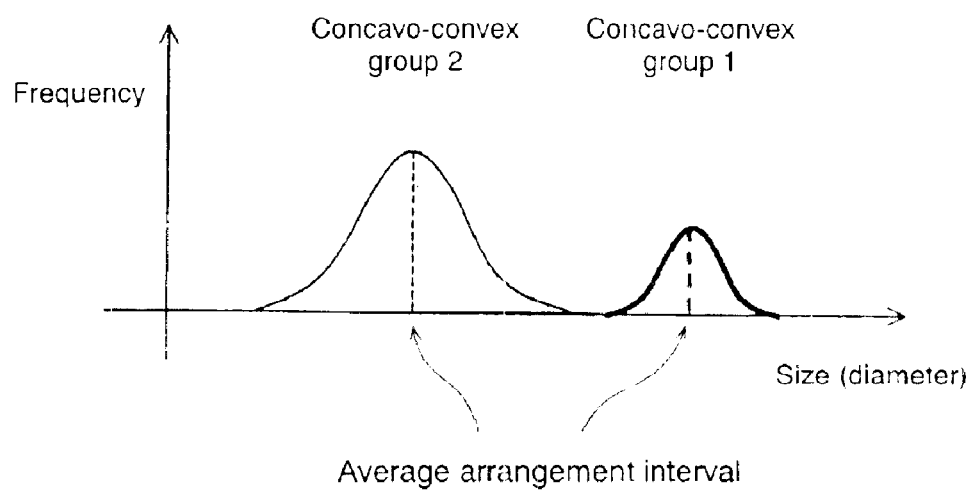
FIG. 6 is a chart for explaining a difference in arrangement interval between the concavo-convex group 1 and the concavo-convex group 2.

With reference to FIGS. 4 to 6, description will be given to the structure of a reflector plate according to a first embodiment of the present invention.

FIG. 4 is a typical view showing the schematic structure of the reflector plate according to the present embodiment, FIG. 4A being a plan view and FIG. 4B being a sectional view.

A plurality of first reflecting units 10 and a plurality of second reflecting units 11 are provided together on the surface of a reflector plate 1. Each of the reflecting units is arranged with little space between them in order to enhance a light utilization efficiency. Hereinafter, a group comprising the first reflecting units 10 will be referred to as a "concavo-convex group 1" and a group comprising the second reflecting units 11 will be referred to as a "concavo-convex group 2".

A reflecting plane 10a of the first reflecting unit 10 and a reflecting plane 11a of the second reflecting unit 11 are provided to face in almost the same direction. Accordingly, the emitting directions of light reflected by both reflecting units (the angles of zero-order diffracted light) are almost coincident with each other.

In the present embodiment, the reflecting plane 10a of the first reflecting unit 10 and the reflecting plane 11a of the second reflecting unit 11 have different sizes from each other. More specifically, as shown in FIG. 4, the reflecting plane 11a of the second reflecting unit 11 is set to be smaller in diameter and have smaller difference in in-plane height of the reflecting plane than that of the reflecting plane 10a of the first reflecting unit 10.

However, the diameters of the reflecting planes 10a and 11a are actually fabricated to permit a constant variation (the diameter of the reflecting plane is intentionally set up with an irregularity or is varied within a range of a dimensional tolerance in respect of processing precision in some cases). For this reason, it is preferable that the difference in size should be understood in the following manner.

More specifically, when a histogram is taken for the diameters of all the reflecting planes included in the reflector plate 1, it can be supposed that two kinds of reflecting planes 10a and 11a having different diameters are included if the distribution of the histogram has two maximum values as shown in FIG. 5.

In the example of FIG. 5A, the distribution of the histogram has two maximum values and each of them overlaps in part. In the example of FIG. 5B, frequency is zero between each distribution. In the example of 5(C), each of the curves has a flat part in the vicinity of a vertex. In all the examples, the distribution having a relatively large diameter is owned by the concavo-convex group 1 and the distribution having a smaller diameter is owned by the concavo-convex group 2. A boundary between the concavo-convex group 1 and the concavo-convex group 2 can be determined between the two maximum values.

In the present embodiment, the first reflecting unit 10 and the second reflecting unit 11 have different arrangement intervals from each other. More specifically, the arrangement interval between the second reflecting units 11 is set to be greater than that between the first reflecting units 10 as shown in FIG. 4.

The arrangement interval is also set to permit a constant variation in the same manner as the diameter of the reflecting plane. Therefore, it is preferable that the difference in the arrangement interval should be understood by a histogram shown in FIG. 6 or by a comparison between the average arrangement interval of the concavo-convex group 1 and that of the concavo-convex group 2.

Figure 7A:
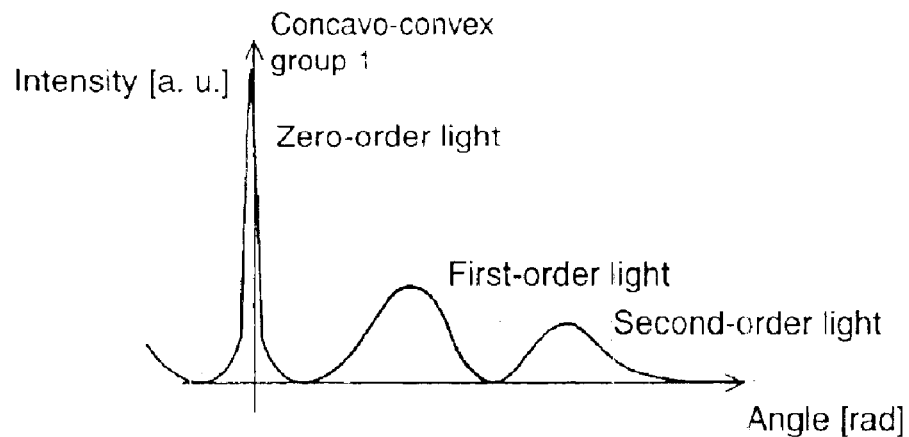
FIG. 7 is a chart showing diffracted light distribution in the Fraunhofer region, FIG. 7A showing diffracted light distribution obtained by only the concavo-convex group 1, FIG. 7B showing diffracted light distribution obtained by the concavo-convex group 2, and FIG. 7C showing diffracted light distribution obtained by the whole reflector plate.
Figure 7B:
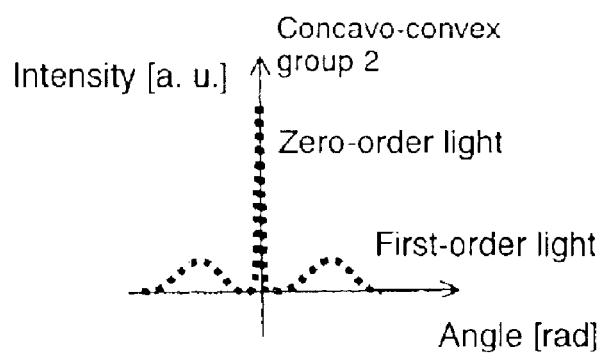

When light is irradiated on the reflector plate 1 having the structure described above, the reflector plate 1 acts as a reflecting diffraction grating. FIG. 7 shows a diffracted light distribution in a Fraunhofer region. FIG. 7A shows a diffracted light distribution obtained by only the concavo-convex group 1, FIG. 7B shows a diffracted light distribution obtained by the concavo-convex group 2 and FIG. 7C shows a diffracted light distribution obtained by the whole reflector plate.

In the present embodiment, the arrangement interval between the second reflecting units 11 is set to be greater than that between the first reflecting units 10. Therefore, a spatial frequency (an inverse number of the arrangement interval) is varied between the concavo-convex group 1 and the concavo-convex group 2. A cycle in which a diffracted light takes a maximum value is determined by the spatial frequency. As shown in FIGS. 7A and 7B, therefore, an angle at which the peak of first-order diffracted light obtained by the concavo-convex group 1 appears is different from an angle at which the peak of first-order diffracted light obtained by the concavo-convex group 2 appears.

Figure 7C:
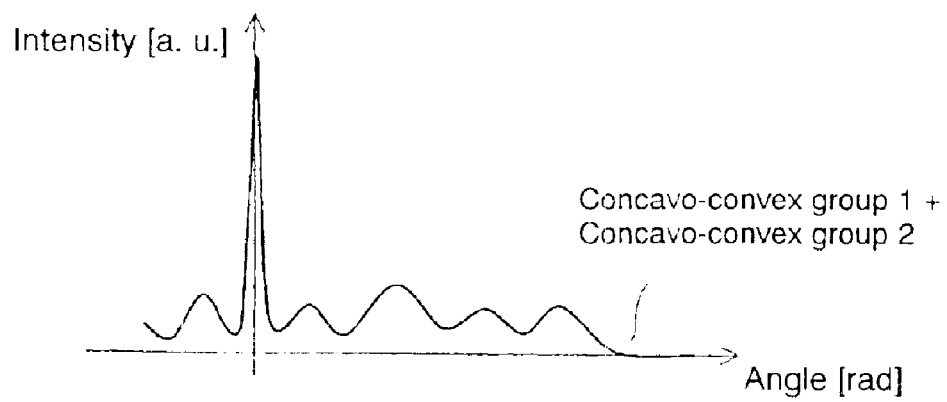

The diffracted light distribution of the whole reflector plate 1 is obtained by the overlap of the diffracted light distribution of the concavo-convex group 1 and that of the concavo-convex group 2 as shown in FIG. 7C.

The emitting direction of an emitted light with respect to an incident light in the reflecting plane 10a of the first reflecting unit 10 is almost coincident with that in the reflecting plane 11a of the second reflecting unit 11. Therefore, zero-order diffracted light of the concavo-convex group 1 is caused to overlap with that of the concavo-convex group 2 at an almost equal angle. Consequently, it is possible to obtain a sufficient amount of reflected light.

On the other hand, the maximum values of first-order diffracted light and other light are caused to overlap at different angles from each other, and first-order diffracted light of the concavo-convex group 2 appears between zero-order diffracted light and first-order diffracted light of the concavo-convex group 1. Consequently, the peak of first-order diffracted light is smoothened as seen from the whole reflector plate so that a difference in an intensity between the peak of first-order diffracted light and a peripheral angle thereof can be decreased. Consequently, it is possible to suppress coloring caused by interference.

Moreover, the size of the second reflecting unit 11 is set to be small enough to suppress the coloring caused by the interference of a diffracted light. Consequently, the size of the first reflecting unit 10 is maintained to be sufficient. Thus, light incident on the reflector plate 1 is reflected by the first reflecting unit 10 so that light utilization efficiency can be increased to obtain sufficient amount of the reflected light.

While two kinds of reflecting units, that is, the first reflecting unit 10 and the second reflecting unit 11 are provided together in the present embodiment, it is also suitable to employ a structure in which third, fourth, . . . reflecting units including reflecting planes having different configurations are provided together. Consequently, it is possible to further reduce a difference in intensity between the peak of first-order diffracted light and the peripheral angle thereof.

Moreover, while the structure includes the reflecting planes 10a and 11a which are curved to be concave in the present embodiment, it is possible to suitably employ a reflecting plane which is curved to be convex.

Furthermore, while the differences in the diameter and in-plane height of the reflecting planes 11a are set to be smaller than those of the reflecting planes 10a in the present embodiment, it is also suitable to employ a structure in which only one of the differences in diameter or in-plane height is smaller. In particular, it is preferable to employ a structure in which only the diameter of the reflecting plane is smaller. The reason is that the control of the diameter is easier in manufacture as compared with the control of the in-plane height.

Next, description will be given to the structure of a reflector plate according to another embodiment of the present invention. In the following description, what is not explained in the first embodiment will be mainly explained, and the same elements have the same designations and will not be explained.

(Second Embodiment of Reflector Plate)

Figure 8A:
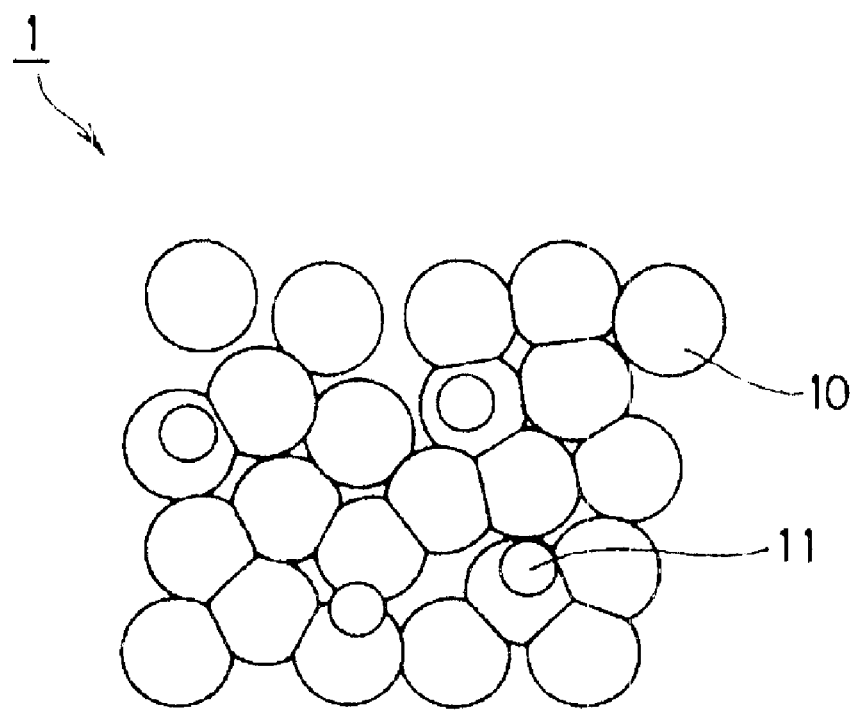
FIG. 8 is a typical view showing the schematic structure of a reflector plate according to the second embodiment of the present invention.
Figure 8B:
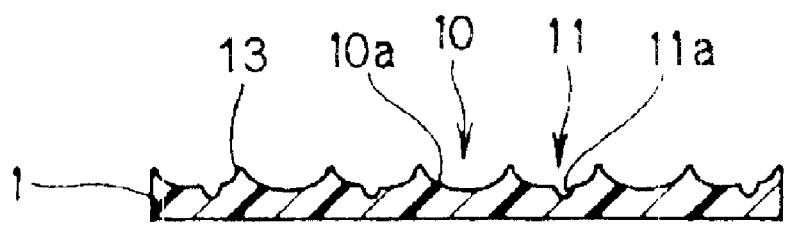
Figure 9A:
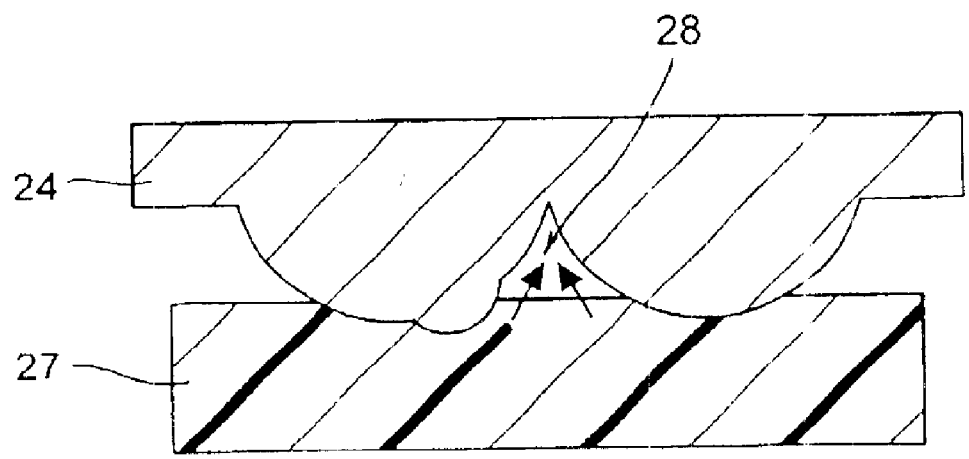
FIG. 9 is an explanatory view showing a method of manufacturing the reflector plate in FIG. 8.
Figure 9B:
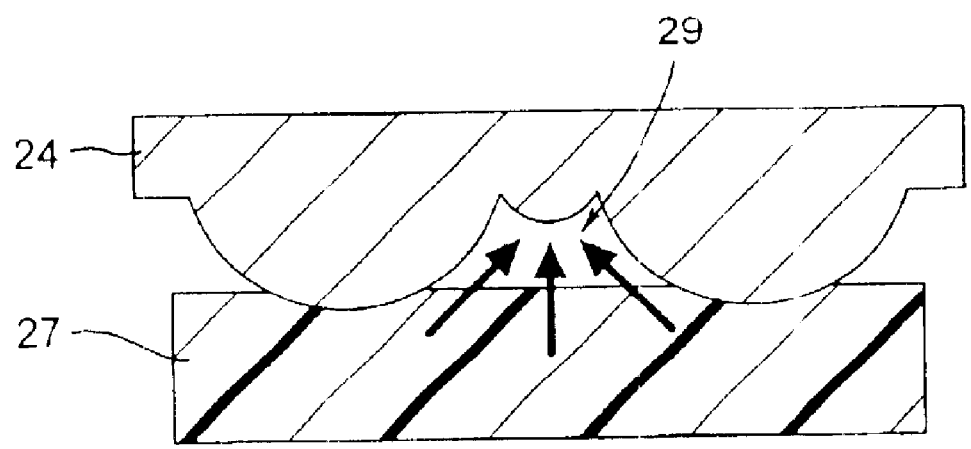

With reference to FIGS. 8 and 9, description will be given to the structure of a reflector plate according to a second embodiment of the present invention. FIG. 8 is a typical view showing the schematic structure of a reflector plate according to the present embodiment, FIG. 8A being a plan view and FIG. 8B being a sectional view. FIG. 9 is an explanatory view showing a method of manufacturing the reflector plate according to the present embodiment, FIG. 9A illustrating the reflector plate according to the present embodiment and FIG. 9B illustrating a method of manufacturing the reflector plate according to the first embodiment.

As shown in FIG. 8, a second reflecting unit 11 is superposed on a first reflecting unit 10 in the present embodiment. The way of the superposition includes the case in which a whole reflecting plane 11a of the second reflecting unit 11 is included in a reflecting plane 10a of the first reflecting unit 10, the case in which a part of the reflecting plane 11a overlaps with a part of the reflecting plane 10a, and the case in which the reflecting plane 11a is provided across a plurality of reflecting planes 10a.

According to this structure, the first reflecting units 10 are provided more densely as compared with a structure in which the first reflecting unit 10 and the second reflecting unit 11 are provided without overlapping as described in the first embodiment. In other words, it is possible to decrease the volume of a convex part 13 between two adjacent or plural first reflecting units 10 as shown in FIG. 8B.

In general, such a concavo-convex shape of the reflector plate 1 is obtained by pushing a metal mold referred to as a stamper 24 against a resin 27 which is the material of a reflector plate and carrying out pressurization and molding as shown in FIG. 9 (which will be described below in detail). The shape of the stamper 24 is obtained by exactly inverting the concavo-convex shape of the reflector plate 1. Consequently, the volume of a concave place 28 (corresponding to the convex part 13) of the stamper 24 according to the present embodiment is smaller than that of a concave place 29 of the stamper 24 according to the first embodiment.

When the stamper 24 is pushed against the resin 27 to mold the concavo-convex shape, consequently, the material of the reflector plate is concentrated into the concave place 28 at a small pressure. Consequently, the pressurization and molding can easily be carried out.

Also in case in which the first reflecting unit 10 and the second reflecting unit 11 are thus superposed together, it is possible to obtain the same functions and effects as those of the first embodiment.

(Third Embodiment of Reflector Plate)

Figure 10A:
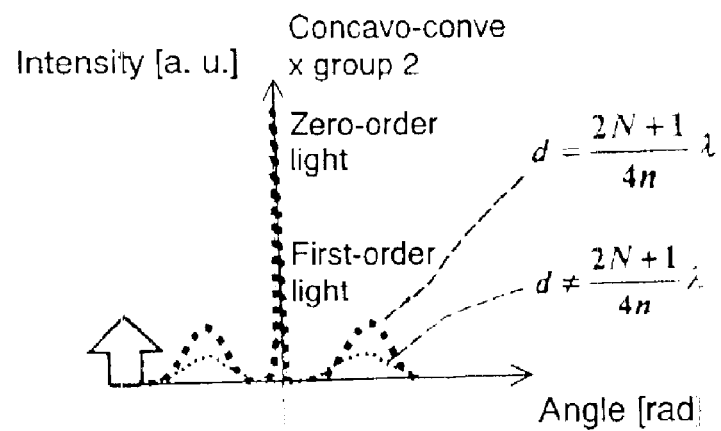
FIG. 10 is a chart showing diffracted light distribution in the Fraunhofer region of a reflector plate according to the third embodiment of the present invention, FIG. 10A showing diffracted light distribution obtained by only a concavo-convex group 2 and FIG. 10B showing diffracted light distribution obtained by the whole reflector plate.
Figure 10B:
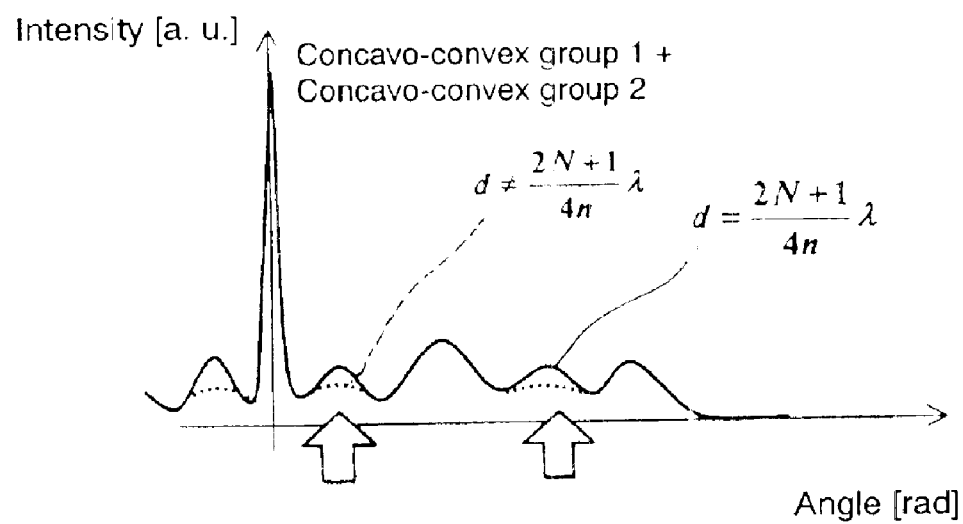

With reference to FIGS. 10 and 11, description will be given to the structure of a reflector plate according to a third embodiment of the present invention. FIG. 10A is a chart showing a diffracted light distribution obtained by only concavo-convex group 2 according to the present embodiment and FIG. 10B is a chart showing a diffracted light distribution obtained by the whole reflector plate. FIG. 11 is a typical view showing the schematic structure of a reflection type display device comprising the reflector plate according to the present embodiment.

Figure 11A:
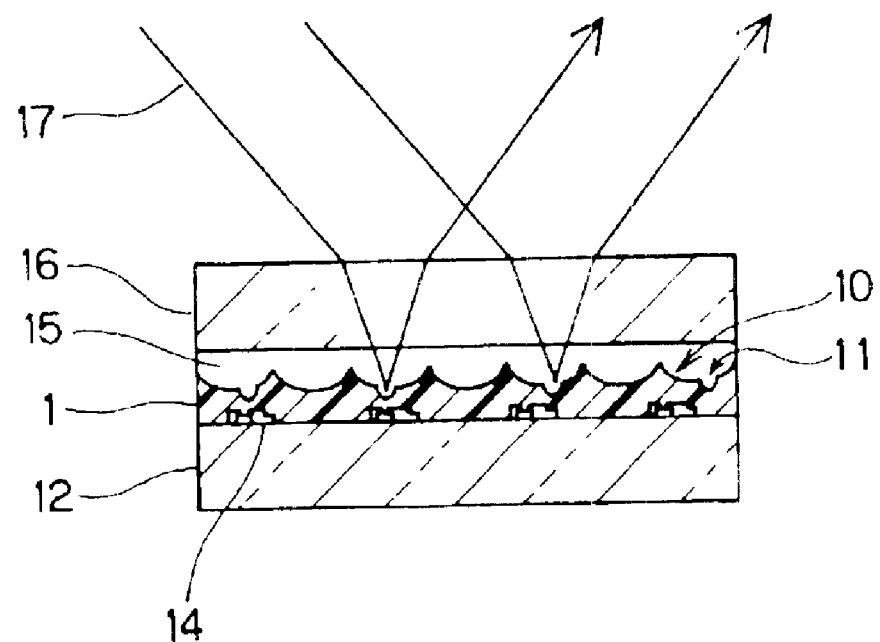
FIG. 11 is a typical view showing the schematic structure of a reflection type display device according to the third embodiment of the present invention.
Figure 11B:
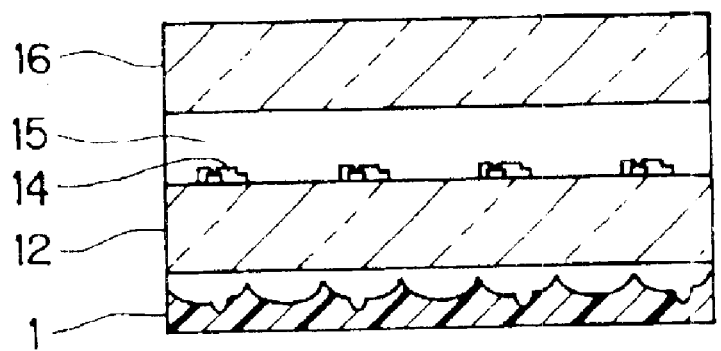

In the present embodiment, a differenced in in-plane height between reflecting planes 11a of a second reflecting unit 11 is determined based on the following equation:

$$d=(2N+1)\lambda/4n (N\text{:integer})$$

wherein λ represents a wavelength of visible light and n represents a refractive index of a reflector plate surface member provided on a reflector plate 1. The reflector plate surface member indicates a layer (an acrylic resin layer or the like) provided between the reflector plate 1 and a liquid crystal layer 15 or the liquid crystal layer 15 itself when the reflector plate 1 is provided between an upper substrate 16 and a lower substrate 12 as shown in FIG. 11A, and indicates an adhesive, a binder or the like to be applied onto the surface of the reflector plate 1 when the reflector plate 1 is bonded to the back side of the lower substrate 12 as shown in FIG. 11B.

When first reflecting units 10 and second reflecting units 11 are compared, the absolute number of the second reflecting units 11 is smaller because of a greater arrangement interval. Consequently, the intensity of first-order diffracted light in a concavo-convex group 1 is higher than that in a concavo-convex group 2.

According to the structure described above, a difference in an optical path between light reflected by the lowest point on the curved reflecting plane 11a of the second reflecting unit 11 and light reflected by the highest point is obtained as follows.

$$2d \cdot n = (N+\tfrac{1}{2})\lambda$$

Consequently, a phase distribution is maximized (a phase difference λ/2). As shown in FIG. 10A, therefore, the intensity of first-order diffracted light obtained by the concavo-convex group 2 is increased. Thus, the intensities of first-order diffracted light in the concavo-convex group 1 and the concavo-convex group 2 become close to each other. Consequently, it is possible to further deteriorate coloring caused by interference as shown in FIG. 10B.

For a specific value of the difference d in in-plane height of the reflecting plane 11a of the second reflecting unit 11, N=0, λ=0.4 μm to 0.7 μm, and n=approximately 1.46 are substituted in the above equation. Consequently, d=0.1 μm to 0.2 μm can be obtained.

(Fourth Embodiment of Reflector Plate)

With reference to FIG. 12, description will be given to the structure of a reflector plate according to a fourth embodiment of the present invention. FIG. 12A is a typical view showing the schematic structure of the reflector plate according to the present embodiment and FIG. 12B is a chart showing the distribution of an arrangement interval of a reflecting unit.

In the present embodiment, an arrangement interval between second reflecting units 11 is set to be an approximately double of that between first reflecting units 10. The arrangement interval is set to permit a constant variation as described above. As shown in FIG. 12B, therefore, the arrangement interval between the reflecting units is actually determined such that an average arrangement interval b of a concavo-convex group 2 is an approximately double of an average arrangement interval a of a concavo-convex group 1.

A cycle in which diffracted light takes a maximum value is proportional to the concavo-convex cycle of a diffraction grating (that is, the inverse number of the arrangement interval between the reflecting units). Therefore, if the arrangement interval is set to be approximately doubled, an angle at which a first-order diffracted light appears at approximately half an angle.

According to the structure described above, therefore, the peak of first-order diffracted light obtained by the concavo-convex group 2 appears at an angle which is an approximately half of the peak of first-order diffracted light obtained by the concavo-convex group 1 (in almost the middle of zero-order diffracted light and first-order diffracted light). Consequently, it is possible to further deteriorate the coloring caused by the interference.

(Fifth Embodiment of Reflector Plate)

Figure 14A:
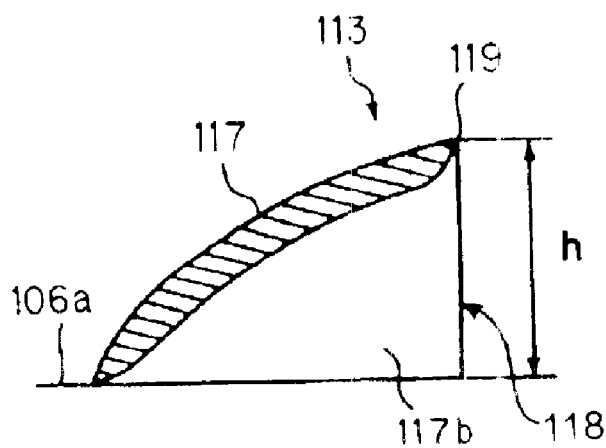
FIG. 14 is an explanatory view showing the sectional structure of the first reflecting unit according to the fifth embodiment of the present invention.
Figure 14B:
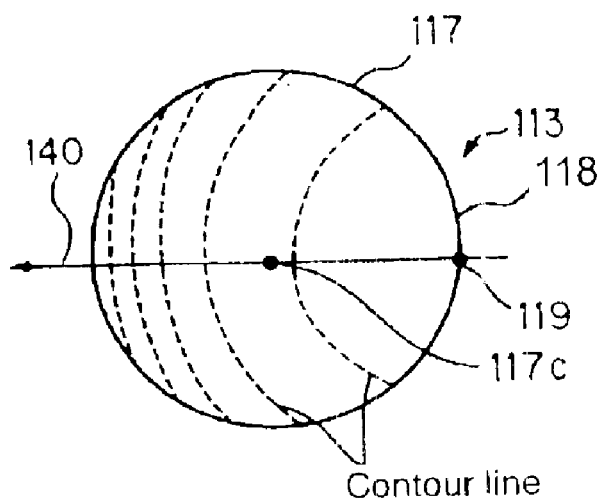
Figure 14C:
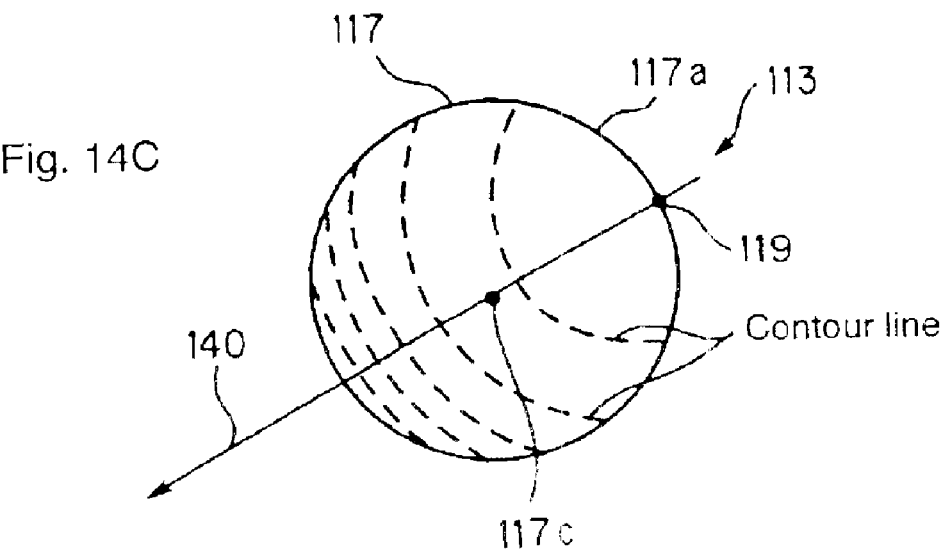
Figure 15:
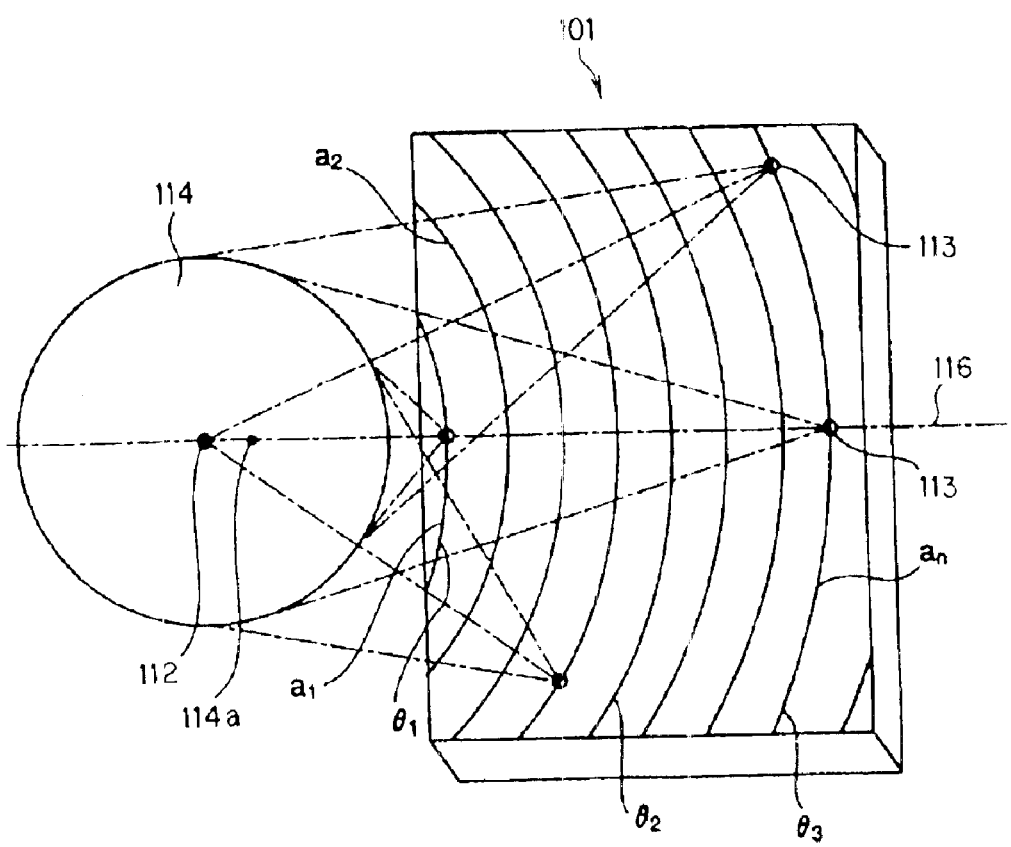
FIG. 15 is an explanatory view showing the schematic structure of the reflector plate according to the fifth embodiment of the present invention.

With reference to FIGS. 13 to 15, description will be given to the structure of a reflector plate according to a fifth embodiment of the present invention.

FIG. 13 is a typical sectional view showing the schematic structure of the reflector plate according to the present embodiment. FIG. 14 is an explanatory view illustrating the sectional structure of a first reflecting unit provided on the surface of the reflector plate. FIG. 15 is an explanatory view illustrating the arrangement of the first reflecting unit in the reflector plate of FIG. 13.

A plurality of first reflecting units 113 and a plurality of second reflecting units 120 are superposed together on the surface of a reflector plate 101. Each of the reflecting units is arranged with little space between them in order to enhance a light utilization efficiency. Hereinafter, a group comprising the first reflecting units 113 will be referred to as a "concavo-convex group 1" and a group comprising the second reflecting units 120 will be referred to as a "concavo-convex group 2".

The respective first reflecting units 113 constituting the concavo-convex group 1 have reflecting planes 117 which are curved to be convex with almost identical configurations to each other. More specifically, the first reflecting unit 113 takes such a shape that a cylindrical erected convex part 118 is cut obliquely as shown in FIG. 14. This surface constitutes the reflecting plane 117 which is curved to be convex. The shape of each reflecting plane 117 is changed in such a manner that an angle (a reflecting angle) θ formed between incident light and reflected light is gradually increased from an end area A toward an end area B in the reflector plate 101.

As shown in FIG. 15, moreover, the first reflecting unit 113 is provided with a predetermined interval along a center line (a vertical bisector) 116 and along concentric circles a1, . . . , an (n: natural number) by using, as a center, a center point 114a set onto the center line 116. Reflecting planes having an equal reflecting angle θ are on the same concentric circle.

The position of a vertex 119 of the reflecting plane 117 and the shape of the reflecting plane 117 itself are designed corresponding to a target emitting area 114. The reflecting plane 117 does not have a plane (a tangential plane) to be perpendicular to incident light when light is incident in perpendicular direction with respect to the reflector plate 101, and has a sharp tip. Therefore, reflected light is rarely emitted in rightward direction in the drawing (an opposite direction to the emitting area 114).

While the respective first reflecting units 113 provided along the same concentric circle have almost the same shapes, a direction in which the reflecting plane 117 faces is slightly varied corresponding to the position of the first reflecting unit 113 in order to collect the reflected light into the common emitting area 114. More specifically, the direction of each reflecting plane 117 is set in such a manner that a line 140 connecting the vertex 119 of the reflecting plane 117 to a center 117c passes through a center 112 of the emitting area 114 as shown in FIGS. 14B and 14C.

On the other hand, the respective second reflecting units 120 constituting the concavo-convex group 2 have reflecting planes 121 which are curved to be convex with almost identical configurations to each other. The shape and direction of the reflecting plane 121 of the second reflecting unit 120 is set in order to collect a reflected light into the emitting area 114 in the same manner as the reflecting plane 117 of the first reflecting unit 113. Accordingly, the emitting directions of lights reflected by the first reflecting unit 113 and the second reflecting unit 120 which are close to each other (the angles of zero-order diffracted light) are almost coincident with each other.

In the present embodiment, differences in diameter and in-plane height of the reflecting plane 121 of the second reflecting unit 120 are set to be smaller than those in the reflecting plane 117 of the first reflecting unit 113. Moreover, an arrangement interval between the second reflecting units 120 is set to be greater than that between the first reflecting units 113. In this respect, the present embodiment is the same as the first embodiment.

According to the structure described above, light 107 incident on the reflector plate 101 is emitted as reflected light 108 having an angle θ1 to be a center of an intensity from the reflecting plane 117 provided along the concentric circle a1, and is emitted as reflected light 109 having an angle θ3 (θ3>θ1) to be a center of an intensity from the reflecting plane 117 provided along the concentric circle an.

Light 108, 115 and 109 reflected by the reflecting planes 117 are concentrated into the external area of the vertical upper area of the reflector plate 101, thereby forming the almost circular emitting area 114 as shown in FIG. 15.

By concentrating the reflected light into the certain emitting area 114, thus, it is possible to enhance a light utilization efficiency, thereby obtaining sufficient amount of reflected light.

Furthermore, it is also possible to obtain the functions and effects in accordance with the first embodiment. Consequently, it is possible to suppress coloring caused by interference.

(Reflector Plate Manufacturing Method)

Figures 16A, 16C, 16D:
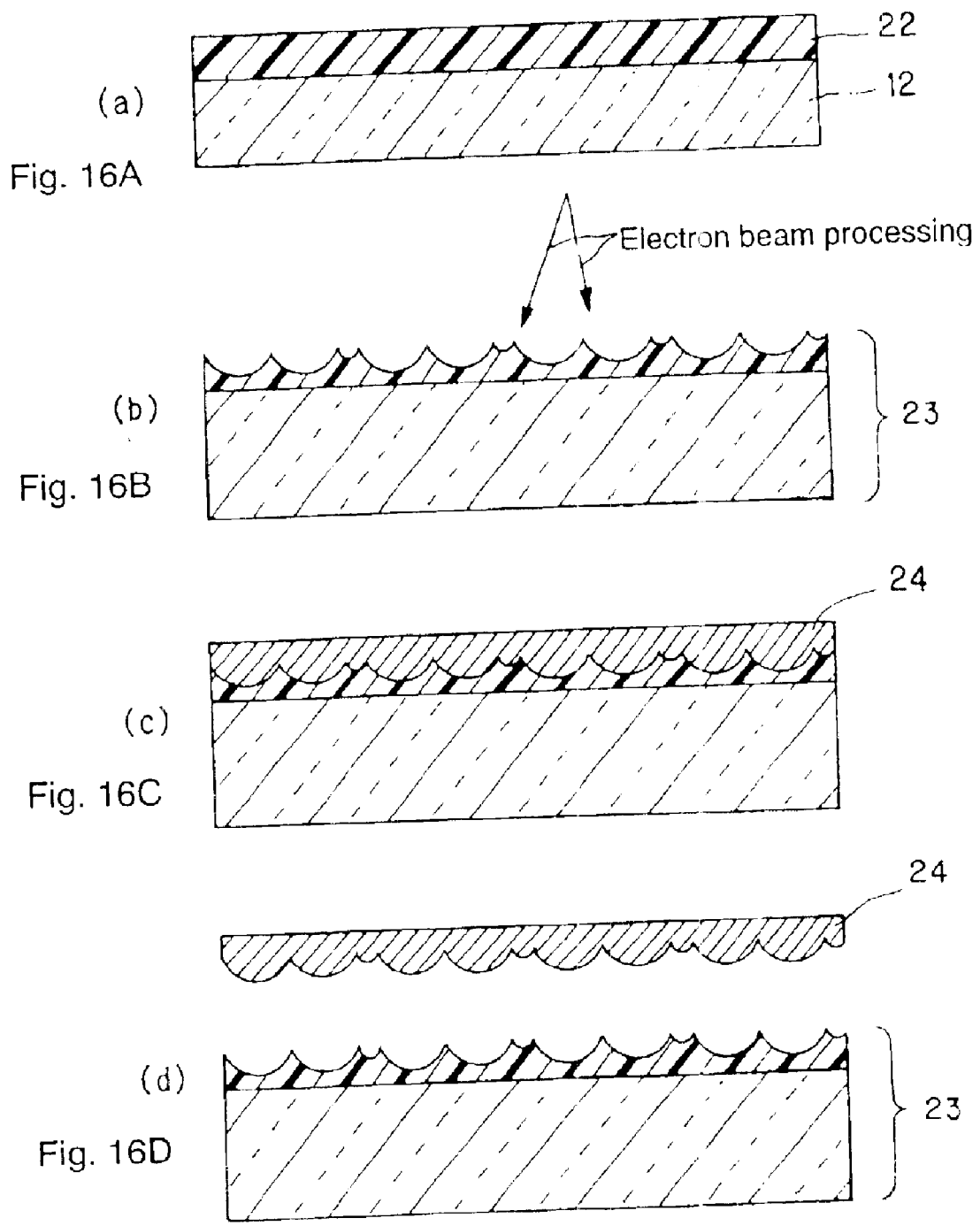
FIG. 16 is an explanatory view illustrating a method of manufacturing a stamper.

Description will be given to a method of manufacturing the reflector plate having the structure described above. The shapes of a concavo-convex group 1 and a concavo-convex group 2 in the reflector plate can be duplicated in large quantities by means of a metal mold referred to as a stamper. A 2P method to be the manufacturing method will be described with reference to FIG. 16.

(a) A lower substrate 12 is prepared and is coated with an electron beam resist 22.

(b) The resist 22 is subjected to fine patterning by an electron beam to take a concave shape so that a concavo-convex shaped master disc 23 is fabricated.

(c) Next, a stamper material such as nickel is stacked on the master disc 23 by electroforming, thereby fabricating a stamper 24.

(d) The stamper 24 is isolated from the master disc 23. The stamper 24 takes a convex shape corresponding to the concave shape so that the metal mold takes a concavo-convex shape.

Next, a method of manufacturing a reflector plate 1 will be described with reference to FIG. 17. As described above, the master disc 23 to be a model of the reflector plate 1 is fabricated, and the stamper 24 is then fabricated by the electroforming. The stamper 24 is provided with an inversion pattern 24a having the shape of a reflector plate surface.

Figure 17A:
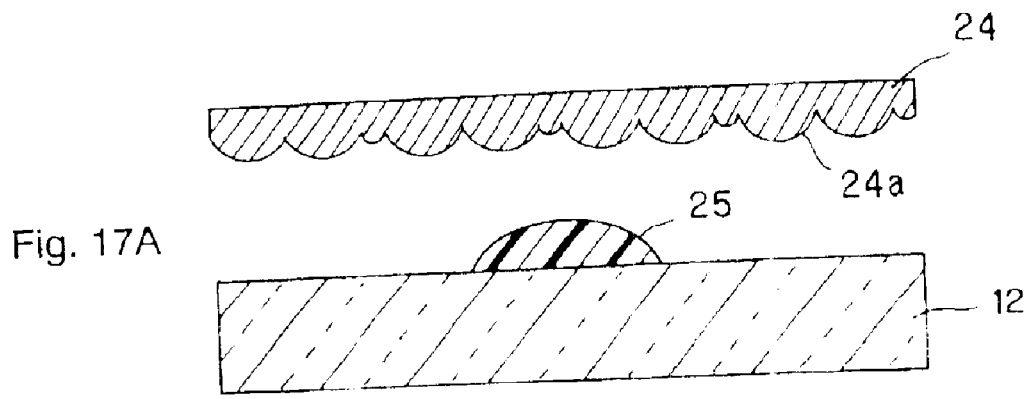
FIG. 17 is an explanatory view illustrating a method of manufacturing a reflector plate.

As shown in FIG. 17A, an ultraviolet curing resin 25 is dropped onto a transparent substrate 12 such as a glass substrate or a transparent resin film (the substrate 12 does not need to be transparent when ultraviolet rays can be transmitted through the stamper 24), and the stamper 24 is then brought down onto the substrate 12 from above the ultraviolet curing resin 25 to press and spread the ultraviolet curing resin 25 between the substrate 12 and the stamper 24 and is thus filled between the substrate 12 and the stamper 24.

Figure 17B:
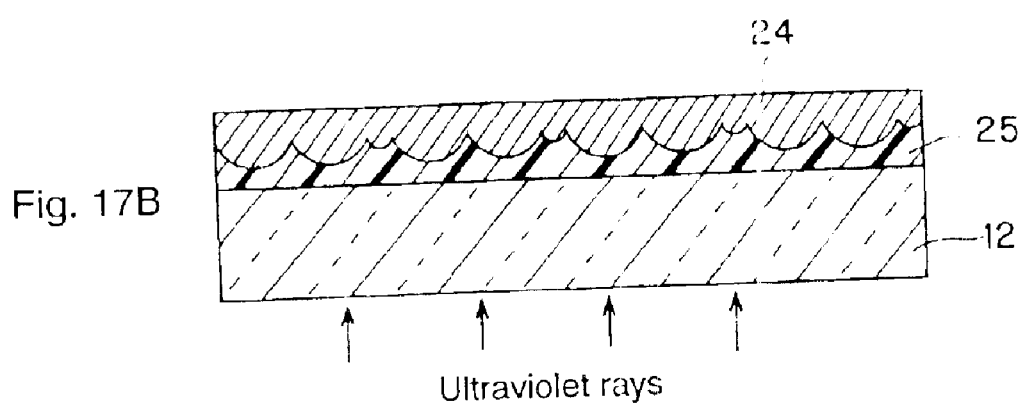
Figure 17C:
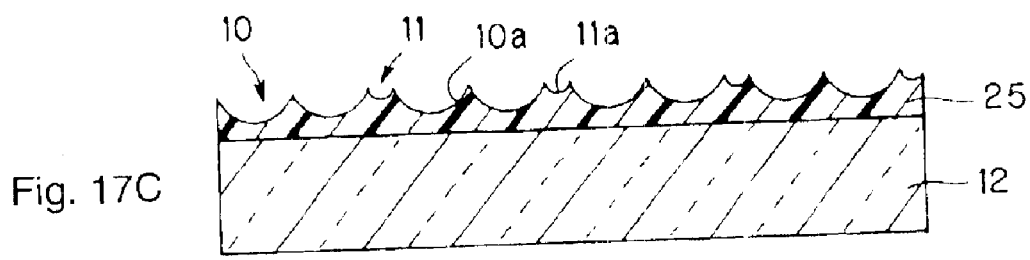

As shown in FIG. 17B, subsequently, ultraviolet rays are irradiated on the ultraviolet curing resin 25 from the substrate 12 side to cure the ultraviolet curing resin 25 by a photo-curing reaction. When the ultraviolet curing resin 25 is cured and the stamper 24 is then peeled from the ultraviolet curing resin 25, the inversion pattern 24a of the stamper 24 is inverted over the surface of the ultraviolet curing resin 25 so that the shapes of the first reflecting unit 10 and the second reflecting unit 11 are transferred as shown in FIG. 17C.

Figure 17D:
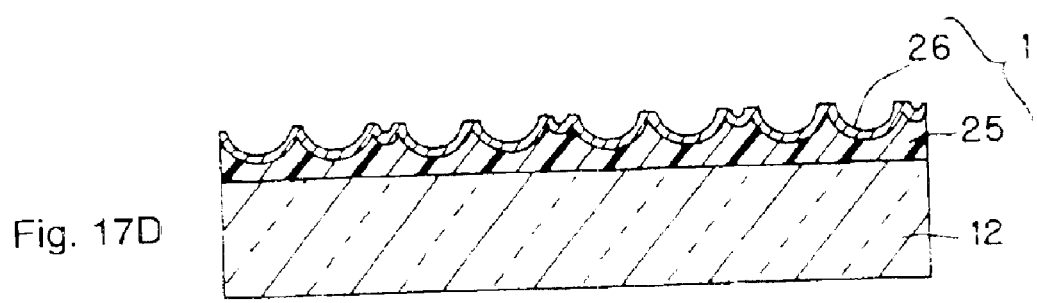

Then, a metallic thin film such as aluminum or silver is deposited on the surface of the ultraviolet curing resin 25 by sputtering or the like to form a reflecting film 26 as shown in FIG. 17D. Thus, the reflector plate 1 is finished.

Next, another method of manufacturing the reflector plate 1 will be described with reference to FIG. 18. As described above, the master disc 23 to be the model of the reflector plate 1 is fabricated and the stamper 24 is then fabricated by the electroforming, and the inversion pattern 24a having the shape of a reflector plate surface is formed on the stamper 24.

Figure 18A:
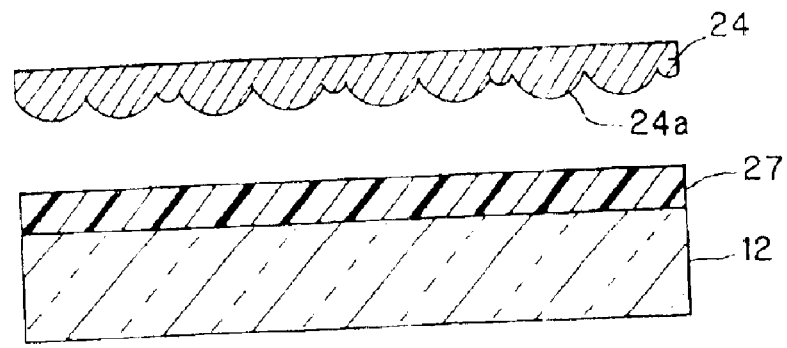
FIG. 18 is an explanatory view illustrating another method of manufacturing a reflector plate.
Figure 18B:
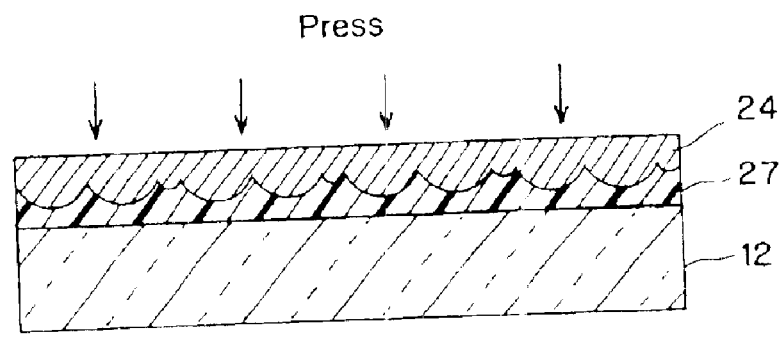
Figure 18C:
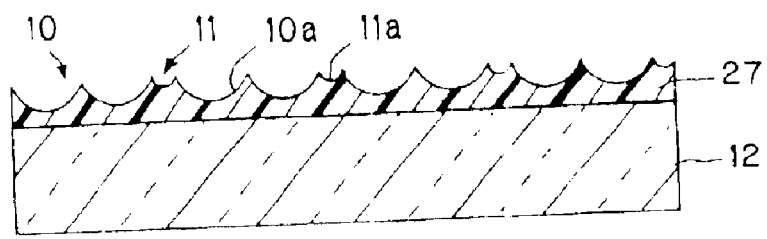

However, a resin 27 such as acryl is spin coated on the substrate 12 as shown in FIG. 18A, and the stamper 24 is then brought down from above the resin 27 to press the resin 27 as shown in FIG. 18B. Consequently, the inversion pattern 24a of the stamper 24 is inverted over the surface of the resin 27 so that the shapes of the first reflecting unit 10 and the second reflecting unit 11 are transferred as shown in FIG. 18C.

Figure 18D:
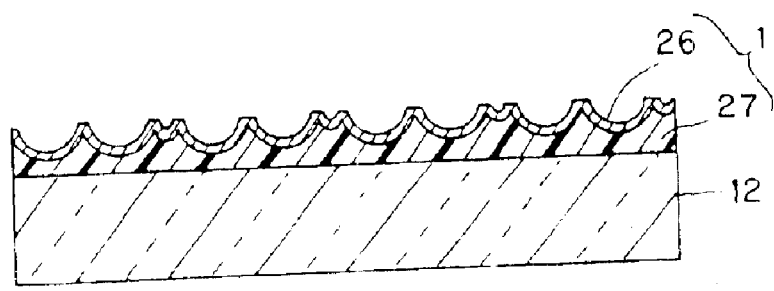

Thereafter, a metallic thin film such as aluminum or silver is deposited on the surface of the resin 27 by sputtering or the like to form the reflecting film 26 as shown in FIG. 18D. Thus, the reflector plate 1 is finished.

(Embodiment of Reflection Type Display Device)

Next, an embodiment of a reflecting display device according to the present invention will be described with reference to FIG. 11 again. All the reflector plates according to the embodiments described above can suitably be used in the present reflecting display device.

The reflection type display device has such a schematic structure that a liquid crystal layer 15 is enclosed between an upper substrate 16 formed by a translucent material and a lower substrate 12 provided with a thin film transistor 14. There is provided a reflector plate 1 for reflecting light incident from the upper substrate 16 side. The liquid crystal layer 15 can vary the transmittance of light reflected by the reflector plate 1.

The reflector plate 1 has such a type as to be provided between the upper substrate 16 and the lower substrate 12 as shown in FIG. 11A and such a type as to be provided on the back side of the lower substrate 12 as shown in FIG. 11B. In general, the former type and the latter type are often used for a color reflection type display device and a monochrome reflection type display device, respectively.

When the reflector plate 1 of the former type is to be fabricated, a thin film transistor 14 is mounted on the surface of the lower substrate 12 before the step shown in FIG. 17 or 18. On the other hand, a black matrix, a color filter, a transparent electrode and the like are formed on the back of the upper substrate 16 and a polarizing plate is stuck to the surface of the upper substrate 16 to form a surface substrate. Then, a liquid crystal layer 15 is interposed between the upper substrate 16 and the lower substrate 12 so that the reflection type display device is finished.

In the reflection type display device having such a structure, light 17 incident from an external part such as a front light provided on the surface side of the upper substrate 16 or sunlight is reflected by the reflector plate 1 so that an image is displayed. At this time, difference in intensity between the peak of first-order diffracted light obtained by the reflector plate 1 and a peripheral angle thereof can be small. Thus, it is possible to carry out the image display having excellent visibility without coloring caused by interference.

(Embodiment of Electronic Apparatus)

Figure 19:
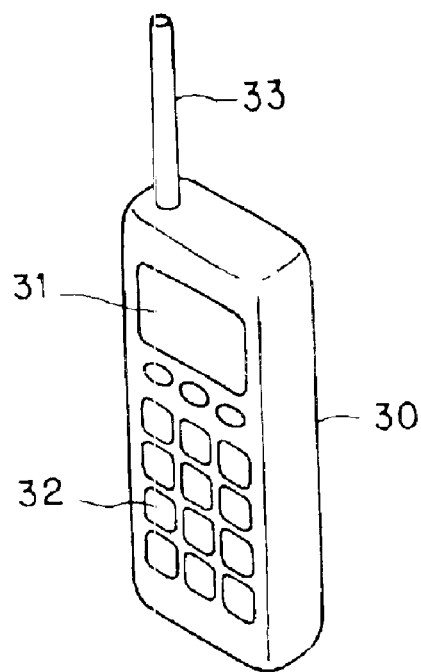
FIG. 19 is a typical view showing the schematic structure of an electronic apparatus according to an embodiment of the present invention.
Figure 20:
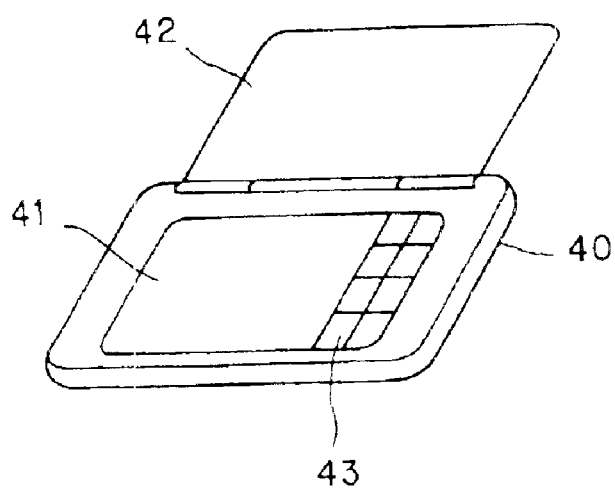
FIG. 20 is a typical view showing the schematic structure of an electronic apparatus according to an embodiment of the present invention.

FIGS. 19 and 20 show an embodiment of an electronic apparatus according to the present invention.

FIG. 19 shows a cell phone 30. The cell phone 30 comprises a display (image display means) 31, a push button 32, an antenna 33 and so on. If the reflection type display device is applied to be the display 31, it is possible to carry out image display having excellent visibility without coloring caused by interference.

Moreover, FIG. 20 shows a portable information terminal 40. The portable information terminal 40 comprises a touch panel (image display means) 41, a cover 42, an input section 43 and so on. If the reflection type display device is applied to be the touch panel 41, it is possible to carry out image display having excellent visibility without coloring caused by interference.

The reflector plate or the reflection type display device according to the present invention is suitably used for various electronic apparatuses such as a personal computer, a monitor, a television, a word processor, an ATM terminal, a POS terminal and the like in addition to the cell phone 30 and the portable information terminal 40.

EXAMPLE

An example based on the embodiments will be described below.

First of all, a conventional reflector plate 1 constituted by only a first reflecting unit shown in Table 1 was fabricated. Next, a reflector plate 2 according to the example of the present invention was fabricated by a mixture of a first reflecting unit and a second reflecting unit which are shown in the Table 1. As described in the second embodiment, the first reflecting unit and the second reflecting unit are superposed.

TABLE 1

|  | Arrangement distance ($\mu$m) | Difference in in-plane height ($\mu$m) | Diameter ($\mu$m) |
| --- | --- | --- | --- |
| First reflecting unit | 10 | 1 | 10 |

TABLE 1-continued

|  | Arrangement distance ($\mu$m) | Difference in in-plane height ($\mu$m) | Diameter ($\mu$m) |
| --- | --- | --- | --- |
| Second reflecting unit | 20 | 0.13 | 1.6 |

In the Table 1, all of the "arrangement distance", the "difference in in-plane height" and the "diameter" are mean values.

These reflector plates were incorporated in a reflection type liquid crystal display device and a visibility was confirmed. As a result, coloring caused by interference was observed with the use of the reflector plate 1, while the coloring caused by the interference was not observed but excellent visibility could be obtained with the use of the reflector plate 2.

As described above, in the present invention, at least two kinds of reflecting units having different diffracted light distributions from each other are provided together. Therefore, the peak of first-order diffracted light can be smoothened as seen from a whole reflector plate and difference in intensity between the peak of first-order diffracted light and a peripheral angle thereof can be small. Accordingly, it is possible to suppress coloring caused by interference and to enhance visibility.

The above description is only illustrative and can be variously changed without departing from the scope of the present invention.

What is claimed is:

1. A reflector plate in which a plurality of first reflecting units and a plurality of second reflecting units are provided together in such a manner that an arrangement interval between the second reflecting units is greater than that between the first reflecting units,
    wherein the first reflecting units and the second reflecting units have reflecting planes which are curved to be concave or convex, and
    the second reflecting units are smaller in diameter and/or have smaller difference in in-plane height than those of the first reflecting units.

2. The reflector plate according to claim 1, wherein the second reflecting section is superposed on the first reflecting unit.

3. The reflector plate according to claim 2, wherein a differenced in in-plane height of the second reflecting units is expressed as follows:

$$d=(2N+1)\lambda/4n \text{ (N=:interger)}$$

wherein a wavelength of a visible light is represented by $\lambda$ and a refractive index of a reflector plate surface member provided on the reflector plate is represented by n.

4. The reflector plate according to claim 2, wherein a differenced in in-plane height of the second reflecting units is set within a range of 0.1 $\mu$m to 0.2 $\mu$n.

5. The reflector plate according to claim 2, wherein an arrangement interval between the second reflecting units is approximately a double of an arrangement interval between the first reflecting units.

6. A reflection type display device comprising the reflector plate according to claim 2 and a layer on the reflector plate for varying a transmittance of light reflected by the reflector plate.

7. The reflector plate according to claim 1, wherein a differenced in in-plane height of the second reflecting units is expressed as follows:

$$d=(2N+1)\lambda/4n \quad (N=\text{:interger})$$

wherein a wavelength of a visible light is represented by $\lambda$ and a refractive index of a reflector plate surface member provided on the reflector plate is represented by n.

8. The reflector plate according to claim 7, wherein an arrangement interval between the second reflecting units is approximately a double of an arrangement interval between the first reflecting units.

9. A reflection type display device comprising the reflector plate according to claim 7 and a layer on the reflector plate for varying a transmittance of light reflected by the reflector plate.

10. The reflector plate according to claim 1, wherein a difference in in-plane height of the second reflecting units is set within a range of 0.1 μm to 0.2 μm.

11. The reflector plate according to claim 10, wherein an arrangement interval between the second reflecting units is approximately a double of an arrangement interval between the first reflecting units.

12. A reflection type display device comprising the reflector plate according to claim 10 and a layer on the reflector plate for varying a transmittance of light reflected by the reflector plate.

13. The reflector plate according to claim 1, wherein an

A reflector plate comprising a plurality of first reflecting units and a plurality of second reflecting units, wherein both of the reflecting units are provided in such a manner that zero-order diffracted lights obtained by the first reflecting units and zero-order diffracted lights obtained by the second reflecting units overlap each other at almost equal angles and first-order diffracted lights obtained by the second reflecting units appear between the zero-order and first-order diffracted lights obtained by the first reflecting units.

14. A reflection type display device comprising the reflector plate according to claim 13 and a layer on the reflector plate for varying a transmittance of light reflected by the reflector plate.

15. A reflection type display device comprising the reflector plate according to claim 1 and a layer on the reflector plate for varying a transmittance of light reflected by the reflector plate.

16. An electronic apparatus comprising the reflection type display device according to claim 15 as image display means.

* * * * *

UNITED STATES PATENT AND TRADEMARK OFFICE
CERTIFICATE OF CORRECTION

| | | |
|---|---|---|
| PATENT NO. | : 6,856,366 B2 | |
| APPLICATION NO. | : 10/383170 | |
| DATED | : February 15, 2005 | |
| INVENTOR(S) | : Motohiko Matsushita et al. | |

It is certified that error appears in the above-identified patent and that said Letters Patent is hereby corrected as shown below:

Column 12, line 49 (Claim 3), change the word "differenced" to --difference d--.

Column 13, line 2 (Claim 7), change the word "differenced" to --difference d--.

Column 14, lines 3-14 (Claim 13), delete the claim in its entirety and insert -- The reflector plate according to claim 1, wherein an arrangement interval between the second reflecting units is approximately a double of an arrangement interval between the first reflecting units.--

Signed and Sealed this

Sixth Day of March, 2007

JON W. DUDAS
*Director of the United States Patent and Trademark Office*